US012240690B2

(12) United States Patent
McCloughen

(10) Patent No.: US 12,240,690 B2
(45) Date of Patent: Mar. 4, 2025

(54) RECEPTACLE LID FASTENER

(71) Applicant: Sarah McCloughen, Elkhart, IN (US)

(72) Inventor: Sarah McCloughen, Elkhart, IN (US)

( * ) Notice: Subject to any disclaimer, the term of this patent is extended or adjusted under 35 U.S.C. 154(b) by 199 days.

(21) Appl. No.: 17/245,450

(22) Filed: Apr. 30, 2021

(65) Prior Publication Data

US 2021/0339948 A1 Nov. 4, 2021

Related U.S. Application Data

(60) Provisional application No. 63/017,762, filed on Apr. 30, 2020.

(51) Int. Cl.
*B65F 1/16* (2006.01)

(52) U.S. Cl.
CPC .................................. *B65F 1/1615* (2013.01)

(58) Field of Classification Search
CPC .. B65F 1/1615; B65F 2210/148; B65D 43/22; B65D 2251/1016; B65D 2251/1058
USPC .................. 220/315, 324, 326, 730, 495.06; 292/251.5
See application file for complete search history.

(56) References Cited

U.S. PATENT DOCUMENTS

| | | | | |
|---|---|---|---|---|
| 1,767,685 | A * | 6/1930 | Lene | B65D 81/3823 220/592.2 |
| 4,782,970 | A | 11/1988 | Edwards | |
| 5,738,395 | A | 4/1998 | Prost | |
| 6,880,717 | B1 | 4/2005 | O'Conor | |
| 8,317,051 | B2 | 11/2012 | Jin | |
| 9,150,354 | B1 | 10/2015 | Gischel | |
| 2010/0102575 | A1 | 4/2010 | Ferkovichß | |
| 2010/0258566 | A1 | 10/2010 | Lee | |
| 2016/0052714 | A1* | 2/2016 | McDade | B65F 1/1615 220/730 |
| 2016/0257491 | A1* | 9/2016 | Manssourian | B65F 1/1615 |

* cited by examiner

*Primary Examiner* — Don M Anderson
*Assistant Examiner* — Elizabeth J Volz
(74) *Attorney, Agent, or Firm* — Indiana University Maurer School of Law, Intellectual Property Legal Clinic

(57) ABSTRACT

According to the present disclosure, a lid fastener and receptacle assembly is provided to removably secure the lid of a garbage receptacle assembly. Lid fastener is designed to allow the contents of the receptacle assembly to be secured within the assembly while it is in an upright position and automatically disengage when receptacle assembly is in the dumping position, relocking when receptacle assembly is returned to the upright position.

15 Claims, 3 Drawing Sheets

RECEPTACLE LID FASTENER

RELATED APPLICATIONS

This application claims the benefit of U.S. Provisional Patent Application No. 63/017,762 filed Apr. 30, 2020, the entire disclosure of which is expressly incorporated by reference herein.

TECHNICAL FIELD

The present disclosure generally relates to a receptacle lid fastener. More particularly, the present disclosure relates to a receptacle lid fastener composed of at least one strap and a connection plate that help to secure the lid of a receptacle.

BACKGROUND AND SUMMARY OF THE DISCLOSURE

This section introduces aspects that may help facilitate a better understanding of the disclosure. Accordingly, these statements are to be read in this light and are not to be understood as admissions about what is or is not prior art.

Many individuals use large or standardized waste receptacles to dispose of garbage on a regular basis. However, these receptacles can have flimsy and lightweight lids, making them susceptible to becoming dislodged easily. This can be done due to weather conditions, such as wind, or by wild animals, such as raccoons. When the lid becomes dislodged, it can lead to garbage being spread across the surrounding area. Not only is cleaning up this mess time-consuming and frustrating, spilled garbage can also be spread far from the waste receptacle that it came from, thus contributing to environmental pollution. Therefore, a device that can secure a waste receptacle lid to the waste receptacle to avoid these issues is ideal.

According to the present disclosure, a lid fastener and a receptacle assembly is provided that includes at least a one strap and a connecting plate. The at least one strap and connection plate cooperate to secure the lid of the receptacle.

According to one aspect of the present disclosure, a lid fastener is provided that includes at least one strap having a first end and a second end, an anchor plate, which is configured to be coupled to a lid portion of a receptacle and coupled to the first end of the at least one strap, and a connection plate which is configured to be couple to at least one of a body portion of the receptacle and the anchor plate is couple to the end of the at least one strap.

The lid fastener may be at least one strap that has a length which is positionably adjustable and comprises a buckle that is configured to maintain the positionably adjusted length. Additionally, the connection plate comprises a releasable attachment mechanism that cooperates with the body portion of the receptacle and the anchor plate to releasable couple the connection plate and at least one of the body portion of the receptacle and the anchor plate. The lid fastener may also include an attachment plate positioned on a body portion of the receptacle to facilitate the connection plate releasably coup hug to the body portion of the receptacle.

According to another aspect of the present disclosure, a lid fastener and receptacle assembly is provided that includes a receptacle having a lid portion and a body portion where a lid fastener may have at least one strap positioned to secure the lid portion to the body portion where the at least one strap may be positionably adjustable to create a positionably adjusted length.

The lid fastener and receptacle may have at least one strap including a buckle configured to maintain the positionably adjusted length. Additionally, the lid fastener may include a connection plate coupled to a second end of the at least one strap and the connection plate may be configured to be coupled to the body portion of the receptacle. The lid fastener may also include an anchor plate fixedly coupled, to the lid portion of the receptacle and the anchor plate may be configured to receive the connection plate. The connection plate may be configured to be releasably couple to the body portion of the receptacle. The body portion of the receptacle may include an attachment plate positioned to facilitate the connection plate releasably coupling to the body portion of the receptacle. The connection plate may also be configured to be releasably coupled to the anchor plate.

According to another aspect of the present disclosure, a lid fastener and receptacle assembly is provided in which a receptacle may have a receptacle that has a lid portion and a body portion with the receptacle having an upright position and a dumping position and an empty state and a filled state. The lid fastener may include at least one strap coupled to the lid portion and a connection plate attached to the at least one strap where the connection plate is configured to be releasably coupled to the body portion to secure the lid portion to the body portion and the connection plate is configured to self-release when the receptacle is in a filled state and in a dumping position. Furthermore, the connection plate may be configured to be manually released.

The connection plate may include a releasable attachment mechanism to releasably couple the connection plate to the body portion of a receptacle. The body portion of the receptacle my include an attachment plate positioned to facilitate the connection plate releasably coupling the body portion of the receptacle. Additionally, the lid portion of the receptacle may also include an anchor plate configured to receive the connection plate. The at least one strap may have a positionably adjustable length. Furthermore, the at least one strap may include a buckle configured to maintain the positionably adjusted length.

BRIEF DESCRIPTION OF THE DRAWINGS

The detailed description of the drawings particularly refers to the accompanying figures in which.

Figure 2:
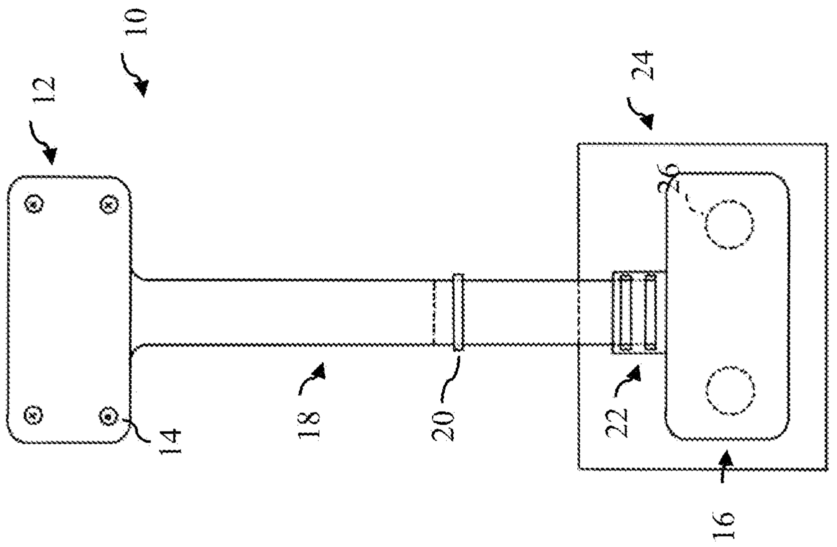
FIG. 2 is a front view of a lid fastener showing the lid fastener having an anchor plate, an adjustable strap, and a connection plate.

The embodiments disclosed below are not intended to be exhaustive or limit the disclosure to the precise form disclosed in the following detailed description. Rather, the embodiments are chosen and described so that others skilled in the art may utilize their teachings. Unless otherwise indicated, the components shown in the figures are shown proportional to each other. It will be understood that no limitation of the scope of the disclosure is thereby intended. The disclosure includes any alterations and further modifications in the illustrative devices and described methods and further applications of the principles of the disclosure which would normally occur to one skilled in the art to which the disclosure relates.

DETAILED DESCRIPTION OF THE DRAWINGS

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

Figure 1:
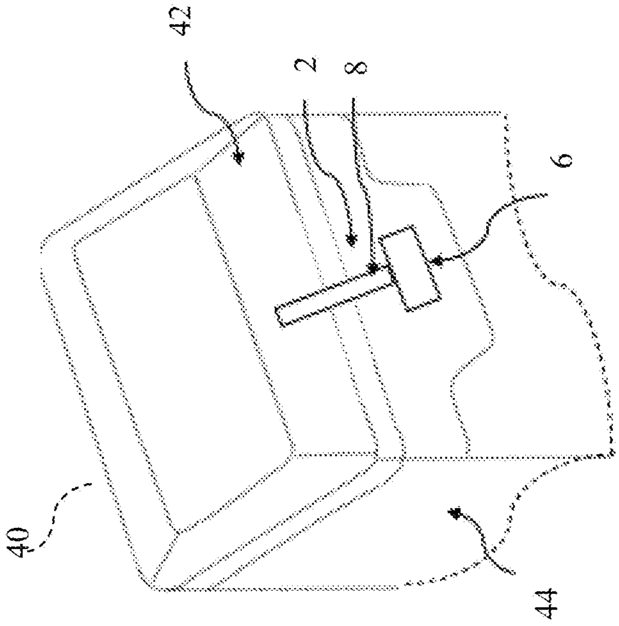
FIG. 1 is a perspective view of a garbage receptacle showing a lid fastener positioned to secure a lid to a body.

As depicted in FIG. 1, a lid fastener 2 is provided to secure a lid portion 42 of a receptacle 40 to a body portion 44 of receptacle 40. Lid fastener 2 includes a strap 8 fixedly coupled to lid portion 42. Lid fastener 2 also includes a connection plate 6 secured to strap 8. When lid portion 42 is closed, connection plate 6 is configured to be releasably coupled to body portion 44.

As depicted in FIG. 2, an embodiment of a lid fastener 10 is provided. An anchor plate 12 may attach to lid portion 42 of receptacle assembly 40. Anchor plate 12 is fastened to lid portion 42 using fasteners 14. Fasteners 14 may include: screws, bolts, nuts, rivets, clips, adhesives, or other mechanical fasteners. Anchor plate 12 may be joined to a connection plate 16 via a strap 18. Strap 18 has a first end which may be coupled to anchor 12 and a second end which may be coupled to connection plate 16. Strap 18 and connection plate 16 may be coupled using buckle 22. Strap 18 and connection plate 16 are removably coupled, such that strap 18 and buckle 22 may be coupled and uncoupled by user. In this preferred embodiment, buckle 22 is a bar buckle, but could also or otherwise include snaps, buttons, lip clasp, hook-and-loop, tongue-in-groove, hook-and-eye, or other mechanical fasteners configured to facilitate adjustment of strap 18 as discussed further herein. In another embodiment, buckle 22 and anchor plate 12 may be a unitary construction.

Strap 18 is positionally adjustable, such that user may adjust the length of strap 18 with buckle 20, making strap 18 shorter or longer as necessary to create a tight closure between lid portion 42 and body portion 44 of receptacle assembly 40. The user adjusted length is maintained by buckle 20 until user adjusts length again. Buckle 20, like buckle 22, may include a bar buckle, snaps, buttons, lip clasp, hook-and-loop, tongue-in-groove, hook-and-eye, or other mechanical fasteners configured to facilitate adjustment of strap 18. Connection plate 16 is removably coupled to an attachment plate 24. Connection plate 16 may attach to attachment plate 24 through the use of two magnets 26 in the embodiment shown in FIG. 2. Connection plate 16 may also be removably coupled to attachment plate 24 through an attachment mechanism such as: more or fewer magnets, adhesive, clips, a hook, or other mechanical fasteners.

Figure 3:
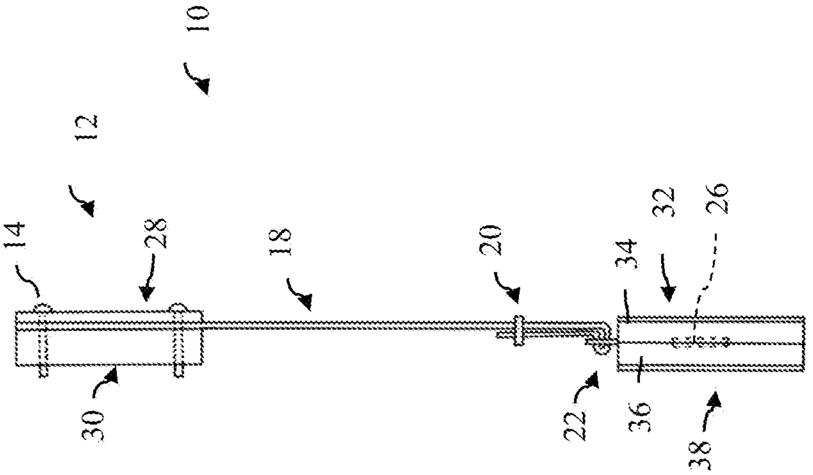
FIG. 3 is an enlarged side view of the lid fastener of FIG. 2, the lid fastener having an adjustable length strap and the anchor plate and connection plate having a series of layers.

As depicted in FIG. 3, a side profile view of lid fastener 10 is shown. Anchor plate 12 includes a first protective top plate 28, a bottom plate 30, and an extension of strap 18. The extension of strap 18 is secured between top plate 28 and bottom plate 30 to create a fixed connection between anchor plate 12 and strap 18. Fasteners 14 are disposed through the entire width of anchor plate 12 to fixedly couple anchor plate 12 to receptacle assembly 40. Strap 18 is attached to connection plate 16 with buckle 22. The length of strap 18 may be adjusted by the user to allow lid fastener 10 to create a tight closure between lid portion 42 and body portion 44 of receptacle body 40. As shown, connection plate 16 includes a second protective plate 32, a top mold 34 to secure magnets 26, a bottom mold 36 to secure magnets 26, and a third protective plate 38. Second protective plate 32 and third protective plate 38 are positioned on the top and bottom layers of connection plate 16, respectively. Second protective plate 32 and third protective plate 38 secure mold 34 insert for magnets 26 in connection plate 16. The components of connection plate 16 may be coupled with screws, bolts, nuts, rivets, clips, adhesives, or other mechanical fasteners.

Figure 4:
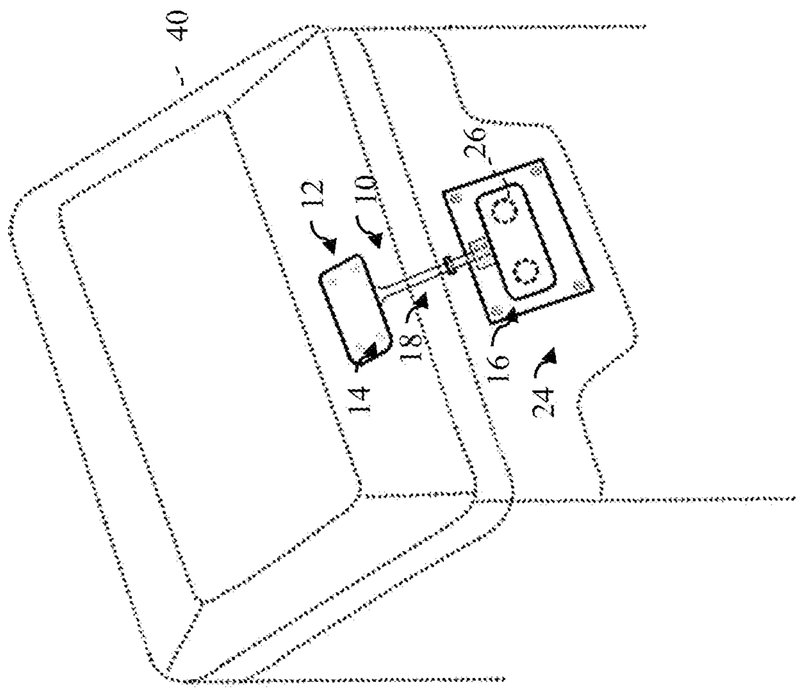
FIG. 4 is a perspective view of a garbage receptacle showing a lid fastener positioned to secure a lid to a body.

As depicted in FIG. 4, a view of lid fastener 10 and receptacle assembly 40 is shown in the closed, secured position. Anchor plate 12 may be attached to receptacle assembly 40 lid portion 42 via fasteners 14. Strap 18 has been adjusted by user to an appropriate length for the geometry of receptacle assembly 40 using buckle 20. Connection plate 16 is attach to attachment plate 24 through magnets 26. Lid fastener 10 is configured in such a way to provide a secure connection that will prevent garbage being removed by wild animals and garbage escaping if receptacle assembly 40 is blown over, while also allowing magnets 26 to disengage from attachment plate 24 if receptacle assembly 40 is turned upside down during the garbage removal process.

Figure 5:
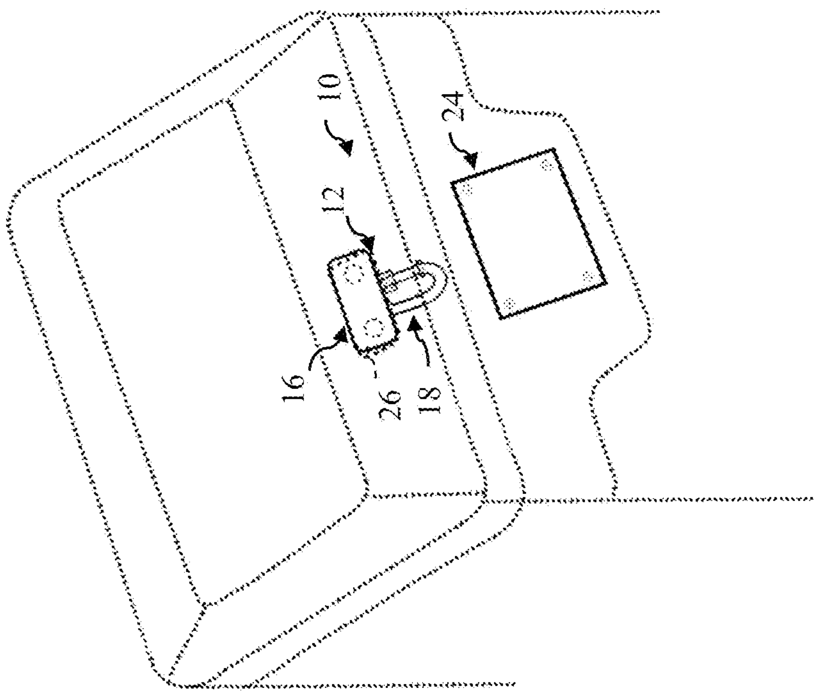
FIG. 5 is a perspective view of the garbage receptacle and lid fastener of FIG. 4 showing the lid fastener in an unlatched position.

As depicted in FIG. 5, a view of lid fastener 10 and receptacle assembly 40 is shown in the open position, ready for the lid of receptacle assembly 40 to be lifted. Connection plate 16 may be removably coupled to anchor plate 12 through magnets 26. In this position, lid portion 42 of receptacle assembly 40 can be freely opened by user to insert or remove contents of receptacle assembly 40. User may couple connection plate 16 to attachment plate 24 by lifting connection plate 16 from anchor plate 12 and allowing magnets 26 to create a connection with attachment plate 24, restoring lid fastener 10 to the position shown in FIG. 4. Strap 18 does not require adjustment by user to move from position in FIG. 3 to FIG. 4 and vice versa.

Those having ordinary skill in the art will recognize that numerous modifications can be made to the specific implementations described above. The implementations should not be limited to the particular limitations described. Other implementations may be possible.

I claim:

1. A lid fastener and a receptacle assembly, comprising:

a receptacle assembly having a lid portion and a body portion defining an opening, the receptacle assembly having an open configuration where the lid portion is at least partially spaced apart from the opening of the body portion and a closed configuration where the lid is covering the opening of the body portion;

at least one positionably adjustable strap having a first end and a second end;

an anchor plate coupled to the lid portion of the receptacle assembly and coupled to the first end of the at least one positionably adjustable strap; and a connection plate coupled to the second end of the at least one positionably adjustable strap, the connection plate selectively coupled to one of the body portion of the receptacle assembly and the anchor plate when the receptacle assembly is in the closed configuration and the connection plate configured to be at least one of coupled to the anchor plate and uncoupled from the body portion of the receptacle assembly when the receptacle assembly is in the open configuration.

2. The lid fastener of claim 1, wherein the at least one positionably adjustable strap further comprises a buckle configured to maintain a positionably adjusted length.

3. The lid fastener of claim 1, wherein the connection plate comprises a releasable attachment mechanism, the releasable attachment mechanism cooperating with the body portion of the receptacle assembly and the anchor plate to releasably couple the connection plate and at least one of the body portions of the receptacle assembly and the anchor plate.

4. The lid fastener of claim 3, wherein the lid fastener further includes an attachment plate positioned on the body portion of a receptacle assembly to facilitate the connection plate releasably coupling to the body portion of the receptacle assembly.

5. A lid fastener and receptacle assembly, comprising:

a receptacle having a lid portion and a body portion;

a lid fastener having at least one strap positioned to secure the lid portion to the body portion, a length of the at least one strap being positionally adjustable to create a positionally adjusted length;

wherein the lid fastener includes a connection plate coupled to a second end of the at least one strap, the connection plate configured to be coupled to the body portion of the receptacle;

wherein the lid fastener includes an anchor plate fixedly coupled to the lid portion of the receptacle, the anchor plate being configured to receive the connection plate.

6. The lid fastener and receptacle assembly of claim 5, wherein the at least one strap includes a buckle configured to maintain the positionably adjusted length.

7. The lid fastener and receptacle assembly of claim 5, wherein the connection plate is configured to be releasably coupled to the body portion of the receptacle.

8. The lid fastener and receptacle assembly of claim 7, wherein the body portion of the receptacle includes an attachment plate positioned to facilitate the connection plate releasably coupling to the body portion of the receptacle.

9. The lid fastener and receptacle assembly of claim 5, wherein the connection plate is configured to be releasably coupled to the anchor plate.

10. A lid fastener and receptacle assembly, comprising:

a receptacle having a lid portion and a body portion, the receptacle having an upright position and a dumping position, the receptacle having an empty state and a filled state; and a lid fastener including at least one strap coupled to the lid portion, a connection plate attached to the at least one strap, the connection plate configured to be releasably coupled to the body portion to secure the lid portion to the body portion, the connection plate configured to self-release when the receptacle is in a filled state and in a dumping position, the connection plate further configured to be manually released;

wherein at least one strap has a length, the length being positionably adjustable.

11. The lid fastener and receptacle assembly of claim 10, wherein the connection plate includes a releasable attachment mechanism to releasably couple the connection plate to the body portion of a receptacle.

12. The lid fastener and receptacle assembly of claim 10, wherein the body portion of the receptacle includes an attachment plate positioned to facilitate the connection plate coupling to the body portion of the receptacle.

13. The lid fastener and receptacle assembly of claim 10, wherein the lid portion of the receptacle includes an anchor plate configured to receive the connection plate.

14. The lid fastener and receptacle assembly of claim 10, wherein at least one strap further comprises a buckle configured to maintain the positionably adjusted length.

15. The lid fastener and receptacle assembly of claim 13, wherein the connection plate is configured to selectively couple to at least one of the body portions of the receptacle and the anchor plate.

* * * * *